(12) United States Patent  (10) Patent No.: US 8,983,384 B2
Miller  (45) Date of Patent: Mar. 17, 2015

(54) APPARATUS AND METHOD FOR EXTENDING BLUETOOTH DEVICE RANGE

(71) Applicant: QUALCOMM Incorporated, San Diego, CA (US)

(72) Inventor: Brian F. Miller, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 13/664,407

(22) Filed: Oct. 30, 2012

(65) Prior Publication Data

US 2014/0119407 A1 May 1, 2014

(51) Int. Cl.
*H04B 7/00* (2006.01)
*H04B 1/713* (2011.01)

(52) U.S. Cl.
CPC ..................................... *H04B 1/713* (2013.01)
USPC ........................................................ 455/41.2

(58) Field of Classification Search
CPC ...... H04W 84/20; H04W 88/06; H04W 84/18
USPC ........................... 455/41.2, 41.3, 556.1, 569.1
See application file for complete search history.

(56) References Cited

U.S. PATENT DOCUMENTS

| | | | | |
|---|---|---|---|---|
| 6,650,871 B1 * | 11/2003 | Cannon et al. | ............... | 455/41.2 |
| 7,613,425 B2 * | 11/2009 | Tailor | ............. | 455/41.2 |
| 7,996,496 B2 * | 8/2011 | Haartsen et al. | .............. | 709/219 |
| 7,996,571 B2 * | 8/2011 | Salokannel | ........................ | 710/3 |
| 8,135,128 B2 * | 3/2012 | Marti et al. | ..................... | 379/372 |
| 2005/0186907 A1 * | 8/2005 | Tailor | ............. | 455/41.2 |
| 2007/0217586 A1 * | 9/2007 | Marti et al. | ............. | 379/201.01 |
| 2008/0152160 A1 * | 6/2008 | Chew et al. | .................. | 381/71.6 |
| 2008/0242229 A1 * | 10/2008 | Sharma | ........................ | 455/41.3 |
| 2010/0151791 A1 * | 6/2010 | Yi et al. | ........................ | 455/41.3 |
| 2010/0240345 A1 * | 9/2010 | Karrman et al. | ........... | 455/414.1 |
| 2011/0059769 A1 * | 3/2011 | Brunolli | ..................... | 455/556.1 |
| 2012/0044062 A1 * | 2/2012 | Jersa et al. | ................. | 340/407.1 |
| 2012/0058727 A1 * | 3/2012 | Cook et al. | .................. | 455/41.3 |

FOREIGN PATENT DOCUMENTS

GB        2484986 A    5/2012

* cited by examiner

*Primary Examiner* — April G Gonzales

(57) ABSTRACT

An apparatus for extending Bluetooth device range includes a Bluetooth range extender device implementing at least two Bluetooth communication profiles such that the Bluetooth range extender device implements a first role to a first standard Bluetooth communication device and implements a second role to a second standard Bluetooth communication device.

12 Claims, 11 Drawing Sheets

APPARATUS AND METHOD FOR EXTENDING BLUETOOTH DEVICE RANGE

DESCRIPTION OF THE RELATED ART

Wireless devices operating in what is referred to as the "Bluetooth" wireless communication spectrum are proliferating. The term "Bluetooth" generally refers to and defines a relatively short range wireless communication protocol, with an operating range of a few meters to a few tens of meters.

The Bluetooth specification includes profiles that define the behavior of each communication endpoint to implement a specific use case. A number of such use cases are contemplated in the Bluetooth specification. These use cases are defined to promote and allow interoperability between endpoint devices from different manufacturers.

The Bluetooth specification defines roles for a pair of device endpoints that together form a single use case. These role pairs are together called a Profile. One example is the Handsfree Profile (HFP) for voice telephony, in which the Bluetooth specification defines one device as the Audio Gateway (AG) and the other device as the Handsfree (HF) device. Another example is the Advanced Audio Distribution Profile (A2DP) for stereo audio streaming, in which the Bluetooth specification defines one device as the audio source (SRC) and another device as the audio sink (SNK). In order for a commercial Bluetooth device to properly function, another device that implements the corresponding role must be present within the radio range of the first device. For example, in order for an HF device such as a Bluetooth headset to function, a device implementing the AG role, such as a cell phone, must be present within radio range.

Unfortunately, the limited range of most Bluetooth devices limits their usefulness in some applications. Prior examples of range extender devices include radio frequency (RF) booster devices, which take the radio energy received within the Bluetooth ISM frequency band, and retransmit it at the same frequency but at a higher power. Such a device could even be "smart" such that it could distinguish between "real" Bluetooth packets and noise, and only retransmit the real packets. However, such radio frequency boosters merely boost the radio frequency (RF) signal without regard to interference from other devices operating in the ISM band, and without regard to Bluetooth transmit (Tx) power control, which can otherwise operate between Bluetooth devices to carefully control the energy received at the antenna for optimal reception.

Therefore, it would be desirable to extend the range of a Bluetooth device while using standard Bluetooth communication protocols and remaining compliant with Bluetooth communication standards.

SUMMARY

An embodiment of an apparatus for extending Bluetooth device range comprises a Bluetooth range extender device implementing at least two Bluetooth communication profiles such that the Bluetooth range extender device implements a first role to a first standard Bluetooth communication device and implements a second role to a second standard Bluetooth communication device.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
FIG. 1 shows a basic system level diagram of an implementation of a Bluetooth range extender device that implements both roles in a Bluetooth profile.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The term "Handsfree Profile" ("HFP") refers to the Bluetooth application for handling 2-way voice traffic and call control.

The term "Advanced Audio Distribution Profile" ("A2DP") refers to the Bluetooth application for handling streaming of stereo audio information from one device to another device.

The term "page scan" refers to the radio mode that passively receives a signal to allow another device to connect.

The term "page" refers to the radio mode that actively transmits to another radio that is in "page scan" mode, to establish a Bluetooth baseband connection between them.

The term "audio gateway" ("AG") refers to the role of HFP that represents a phone or a handset.

The term "handsfree" ("HF") refers to the role of HFP that represents the earpiece or headset.

The term "RFCOMM" refers to a communication channel that emulates a serial port and is used for further communication between an AG and an HF.

The term "service level connection" ("SLC") refers to a communication channel that runs over an RFCOMM link and is used to send AT commands and responses between an AG and an HF.

The term "AT commands/responses" refer to a simple command/response protocol that is used for call control (ring/answer/hangup, etc.) and other commands such as volume up/down, etc., in the Handsfree Profile.

The term "source device" ("SRC") refers to the role of A2DP that represents a source device, such as a phone or a handset.

The term "sink device" ("SNK") refers to the role of A2DP that represents the device that receives the streaming audio signal, such as an earpiece or headset.

The term "audio/video distribution transport protocol" ("AVDTP") refers to a protocol that provides transport of encoded multimedia packets over Bluetooth.

The term "endpoint device" refers to a device connected to the Bluetooth range extender device.

A Bluetooth communication device that implements both roles of a profile within one device could function as a range extender. For example using HFP, if one device implemented both the AG role and the HF role, such a device could maintain one Bluetooth connection to an HF device while simultaneously maintaining another Bluetooth connection to an AG device. The Bluetooth range extender device effectively spoofs both roles, and passes data between them at the profile level in order to extend the range of the commercial devices to which it connects. The Bluetooth range extender device could be located at the maximum radio range of the other two devices, which defines a maximum connection distance for the entire system that is greater than either of the subsystem connections.

While the use of a Bluetooth range extender device to extend the range of HFP and A2DP will be described herein in detail, the apparatus and method for extending Bluetooth device range can be used for any Bluetooth profile, including, but not limited to, AVRCP (A/V Remote Control Profile), BIP (Basic Imaging Profile), BPP (Basic Printing Profile), DI (Device ID Profile), DUN (Dial-Up Networking Profile), FTP (File Transfer Profile), GAVDP (Generic A/V Distribution Profile), GOEP (Generic Object Exchange Profile), GNSS (Global Navigation Satellite System Profile), HCRP (Hardcopy Cable Replacement Profile), HDP (Health Device Profile), HFP (Hands-Free Profile), HSP (Headset Profile), HID (Human Interface Device Profile), MAP (Message Access Profile), OPP (Object Push Profile), PAN (Personal Area Networking Profile), PBAP (Phone Book Access Profile), SAP (SIM Access Profile), SDAP (Service Discovery Application Profile), SPP (Serial Port Profile), SYNCH (Synchronization Profile), and VDP (Video Distribution Profile).

FIG. 1 shows a basic system level diagram of an implementation of a Bluetooth range extender device 110 that implements both roles in a Bluetooth profile. For example only, the Bluetooth range extender device can implement the Handsfree Profile (HFP), the Advanced Audio Distribution Profile (A2DP), or any other Bluetooth profile. When the Bluetooth range extender device 110 implements HFP, it implements both the HF role and the AG role. When the Bluetooth range extender device 110 implements A2DP, it implements both the SRC role and the SNK role.

As an example, the Bluetooth range extender device 110 communicates with a first standard Bluetooth device 102 over a first Bluetooth communication link 104 and with a second standard Bluetooth device 106 over a second standard Bluetooth communication link 108. The first standard Bluetooth device 102 and the second standard Bluetooth device 106 can be referred to as endpoint devices. In HFP, the first standard Bluetooth device 102 can be a handsfree (HF) device, such as a headset, and the second standard Bluetooth device 106 can be an audio gateway (AG), such as a phone. In A2DP, the first standard Bluetooth device 102 can be a source (SRC) device, such as a music player, and the second standard Bluetooth device 106 can be a sink (SNK) device, such as a headset.

Using HFP as an example only, the range extender device 110 could be implemented in such a way that it appears as a normal AG device to the HF device 102, and appears as a normal HF device to the AG device 106. This means that the Bluetooth range extender device 110 would be fully interoperable with any commercial HF or AG device, and range extension is accomplished without requiring any changes to the first and second standard Bluetooth devices.

Figure 2:
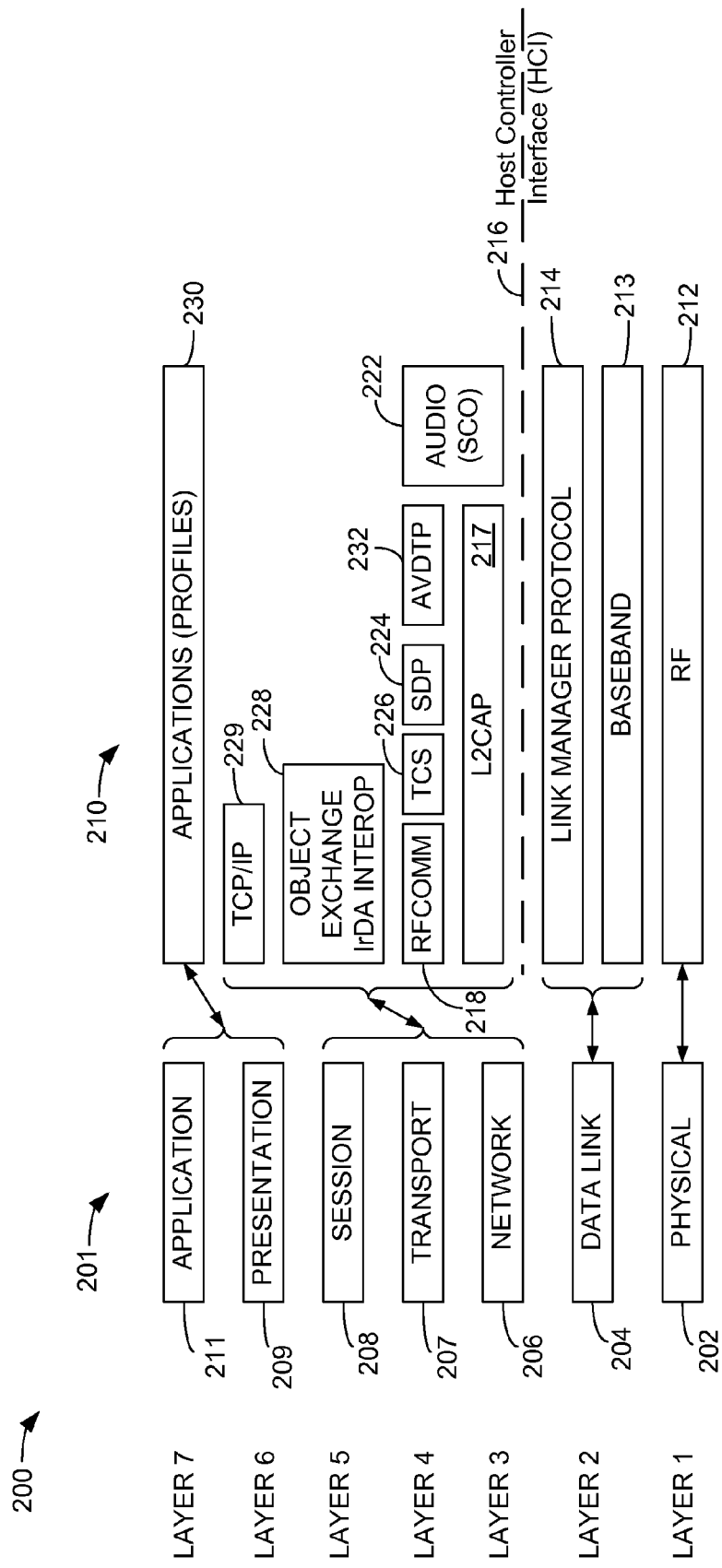
FIG. 2 is a diagram illustrating the relationship between a Bluetooth protocol stack and the Open Systems Interconnect (OSI) seven layer model.

FIG. 2 is a diagram 200 illustrating the relationship between a Bluetooth protocol stack and the Open Systems Interconnect (OSI) seven layer model.

In order to standardize the transmission of information between points over the Internet or the like networks, an OSI (Open Systems Interconnection) model 201 was established. The OSI model 201 separates the communications processes between two points in a network into seven stacked layers, with each layer adding a set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Layer 1, the physical layer 202, conveys the bit stream through the network at the physical level. The Institute of Electrical and Electronics Engineers (IEEE) sub-divides the physical layer into the PLCP (Physical Layer Convergence Procedure) sub-layer and the PMD (Physical Medium Dependent) sub-layer.

Layer-2, the data-link layer 204, provides synchronization for the physical level, performs bit-stuffing and furnishes transmission protocol knowledge and management, etc. The IEEE sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer-3, the network layer 206, handles routing and forwarding, etc.

Layer-4, the transport layer 207, manages end-to-end control and error-checking, etc.

Layer 5, the session layer 208, establishes, coordinates, and terminates conversations, exchanges and dialogs between the applications, etc.

Layer 6, the presentation layer 209, converts incoming and outgoing data from one presentation format to another, etc.

Layer 7, the application layer 211, is a layer at which, e.g., communication partners are identified, quality of service is identified, user authentication and privacy are considered, constraints on data syntax are identified, etc.

As it relates to the OSI seven layer model, the radio frequency (RF) layer 212 of the Bluetooth protocol stack 210 corresponds to the physical layer 202. The baseband layer 213 and the link manager protocol layer 214 correspond to the data link layer 204. A host controller interface 216 separates the lower layers from the upper layers.

The L2CAP 217, RFCOMM 218, Audio 222, object exchange 228, TCP/IP 229, service discovery protocol (SDP) 224, TCS 226 and AVDTP 232 functions correspond to the network layer 206, transport layer 207 and session layer 208. The applications layer 230 comprises the Bluetooth profiles and corresponds to the presentation layer 209 and the application layer 211. The applications layer 230 comprises the Bluetooth profiles, such as HFP for voice, and A2DP for stereo streaming. Thus, a Bluetooth profile is synonymous with an "application" in the OSI seven layer model. As will be described in detail below, the apparatus and method for extending Bluetooth device range involves moving data between application layers.

As it relates to Bluetooth HFP, the RFCOMM channel 218 comprises a communication channel that emulates a serial port that is used for further communication between an AG device and an HF device. The term "service level connection" ("SLC") is the name of an RFCOMM channel used for HFP.

Figure 3:
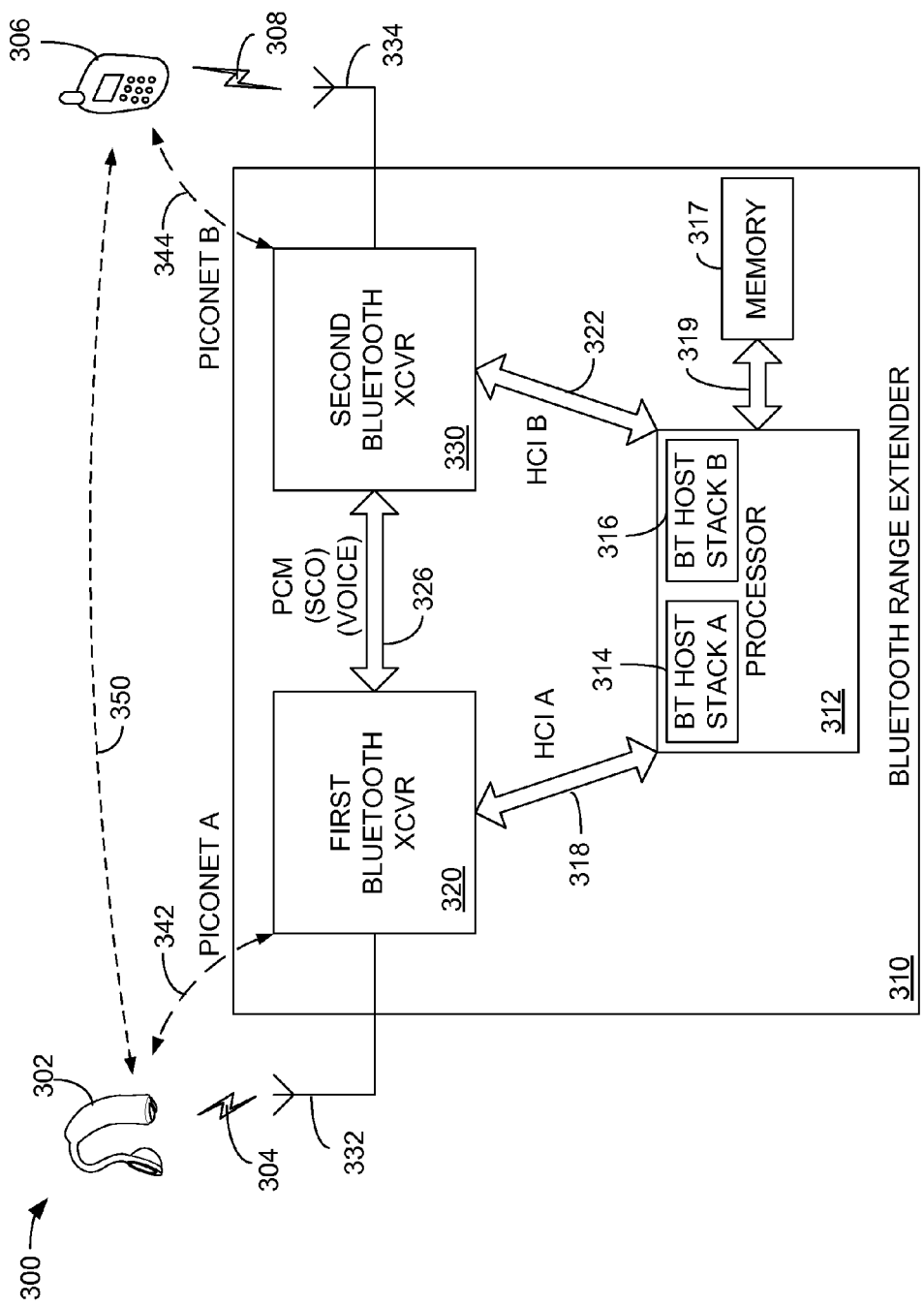
FIG. 3 is a functional block diagram illustrating a first embodiment of an apparatus for extending Bluetooth device range.

For voice audio connections, such as in the Bluetooth HFP, the voice data is carried over a separate baseband link called a synchronous connection-oriented (SCO) channel represented by audio function 222. For A2DP, the audio data (uni-directional, stereo data) goes over AVDTP, which goes over L2CAP. At the radio level, all L2CAP data flows over an ACL (Asynchronous Connectionless) radio link. This is a different baseband link than SCO. Thus, the audio function 222 applies only to voice data (bidirectional mono data). The audio data referred to by the audio function 222 flows directly between the two Bluetooth radios in the Bluetooth range extender device 110 over a dedicated audio bus (typically a pulse code modulated (PCM) bus as shown in FIG. 3). The SCO channel represented by the audio function 222 is separated from other data so that it has low and deterministic latency. The SCO channel represented by the audio function 222 is not carried over the normal "data" layers, such as L2CAP 217 and RFCOMM 218, but rather is processed directly by the Bluetooth radio chip and typically moves into and out of the radio chip using a PCM data bus (shown in FIG. 3). If the Bluetooth range extender device 110 is implemented using two separate Bluetooth radio chips, then the PCM bus to each radio chip should be connected together in order to transport the corresponding SCO data between the radio chips and thus between the endpoint devices with the lowest possible latency. If instead the Bluetooth range extender device 110 is implemented using a single Bluetooth radio chip, then that chip would either internally exchange the SCO packets between separate piconet connections, or it would send the SCO data as data packets to the host processor (called SCO-over-HCl) in which case the host processor would exchange the SCO data between the two connections (i.e. incoming SCO packets received from the radio chip on one piconet would be sent back down to the radio chip as outgoing SCO packets for the other piconet).

The service discovery protocol (SDP) function 224 is a protocol that devices use just after connecting in order to browse the capabilities of the other device. Before establishing a profile level connection (such as HFP), a device desiring HFP connectivity will first browse the SDP records of the device to which it is connecting to see if it supports HFP. Thus, the browsing device is the SDP client, and the device being discovered is the SDP server. If a first device opens an SDP session with the Bluetooth range extender device 110 (first device as SDP client, the Bluetooth range extender device 110 as SDP server) then the Bluetooth range extender device 110 could forward these requests on to a second device (the Bluetooth range extender device 110 as SDP client, second device as SDP server). Any SDP request sent from the first device to the Bluetooth range extender device 110 would be forwarded on to the second device, and the response from the second device would then be returned to the first device. This would allow the first device to discover all services on the second device, with the Bluetooth range extender device 110 passing requests and responses through but not participating in the SDP protocol. Furthermore, the Bluetooth range extender device 110 could modify the SDP protocol messages if desired to, for example, disable features that the Bluetooth range extender device 110 does not support (e.g., if the Bluetooth range extender device 110 does not support file transfer protocol (FTP), then it could modify SDP responses so that they did not indicate FTP support).

FIG. 3 is a functional block diagram 300 illustrating a first embodiment of an apparatus for extending Bluetooth device range. The description to follow will use HFP as an example Bluetooth profile. Other Bluetooth profiles, such as A2DP and others, are also possible. In the embodiment shown in FIG. 3, the Bluetooth range extender device 310 is an embodiment of the Bluetooth range extender device 110 and is implemented using two separate Bluetooth transceivers, also referred to as radios. A first transceiver 320 is used to implement the AG role to a first standard Bluetooth device 302; and a second transceiver 330 is used to implement the HF role to a second standard Bluetooth device 306. In an embodiment, the first standard Bluetooth device 302 is an HF device, such as a wireless headset, and the second standard Bluetooth device 306 is an AG device, such as a handset.

The first transceiver 320 implements a first Bluetooth communication link 304 between the communication system 332 and the first standard Bluetooth device 302. The second transceiver 330 implements a second Bluetooth communication link 308 between the communication system 334 and the second standard Bluetooth device 306.

The Bluetooth range extender device 310 also comprises a processor 312 in communication with the first transceiver 320 and the second transceiver 330. As an example, the processor 312 communicates with the first transceiver 320 over a host controller interface (HCl) 318 and communicates with the second transceiver 330 over an HCl 322. The processor 312 implements a first Bluetooth host protocol stack 314 and implements a second Bluetooth host protocol stack 316. The first Bluetooth host protocol stack 314 corresponds to first Bluetooth communication link 304 and the second Bluetooth host protocol stack 316 corresponds to second Bluetooth communication link 308 Implementing the first Bluetooth host protocol stack 314 and the second Bluetooth host protocol stack 316 allows the Bluetooth range extender device 310 to appear as an AG device to the first standard Bluetooth device 302 and as an HF device to the second standard Bluetooth device 306. The processor 312 is also in communication with a memory 317 over a communication bus 319. The memory 317 can comprise volatile memory, non-volatile memory, or a combination of volatile and non-volatile memory, and can store various instructions to be executed by the processor 312, such as the instructions to allow the Bluetooth range extender device 310 to function as described herein.

The first transceiver 320 also communicates with the second transceiver 330 over a communication bus, such as a pulse code modulation (PCM) bus 326. When implementing HFP, voice communication occurs between the first transceiver 320 and the second transceiver 330 using the PCM bus 326 to transfer the synchronous connection-oriented (SCO) voice data.

When implemented using two Bluetooth transceivers, the first transceiver 320 establishes a first piconet 342 with the first standard Bluetooth device 302 and the second transceiver 330 establishes a second piconet 344 with the second standard Bluetooth device 306. This allows a Bluetooth connection 350 to be established between the first standard Bluetooth device 302 and the second standard Bluetooth device 306 using the Bluetooth range extender device 310 to extend the communication range to an amount greater than if the first standard Bluetooth device 302 were directly connected to the second standard Bluetooth device 306.

Implementing the Bluetooth range extender device 310 using two separate Bluetooth transceivers can provide maximum performance, and the frequency hopping nature of Bluetooth technology would allow both transceivers 320 and 330 to function simultaneously with minimal interference since packet collisions would only occur when both transceivers 320 and 330 randomly hopped to the same channel. In such a case the corrupted packet would be automatically non-acknowledged (NAKed) and retransmitted on a new random channel. Further, implementing the Bluetooth range extender device 310 using two separate Bluetooth transceivers 320 and 330 also allows each Bluetooth communication link 304 and 308 to be separately optimized. For example, each communication link 304 and 308 could negotiate an Adaptive Frequency Hopping (AFH) channel hopping sequence that is optimized to avoid the specific radio frequencies of interference encountered in that link, which may be different from the other link. Separate and independent Bluetooth communication links 304 and 308 allow AFH to be customized for each communication link in order to avoid different radio channels on the two communication links corresponding to different sources of ISM band interference which may affect the two communication links differently. Also, such separate and independent Bluetooth communication links allow transmit power control to be managed independently for each communication link, in order for each transceiver 320 and 330 (specifically, each receiver within each transceiver 320 and 330) to independently and accurately adjust the corresponding transmitter on its connection, so that the receiver on that connection receives the most error-free packets possible. Throughput is also maximized through the use of two concurrent communication links that do not have to time slice between piconets. In addition, power consumption can also be reduced on the first standard Bluetooth device 302 and/or the second standard Bluetooth device 306 because the distance between either or both of the first standard Bluetooth device 302 and the second standard Bluetooth device 306 and the Bluetooth range extender device 310 is shorter than the distance would be between the first standard Bluetooth device 302 and the second standard Bluetooth device 306 if the Bluetooth range extender device 310 were not present. This has the effect of reducing the required transmit power and avoiding retransmissions due to having a stronger radio signal and dropping fewer transmissions. Further, newer endpoint devices can take full advantage of newer Bluetooth power saving and throughput features, assuming that those features are also implemented in the Bluetooth range extender device 310, rather than being forced into older, legacy modes of operation if one endpoint device is an older, legacy device.

Figure 4:
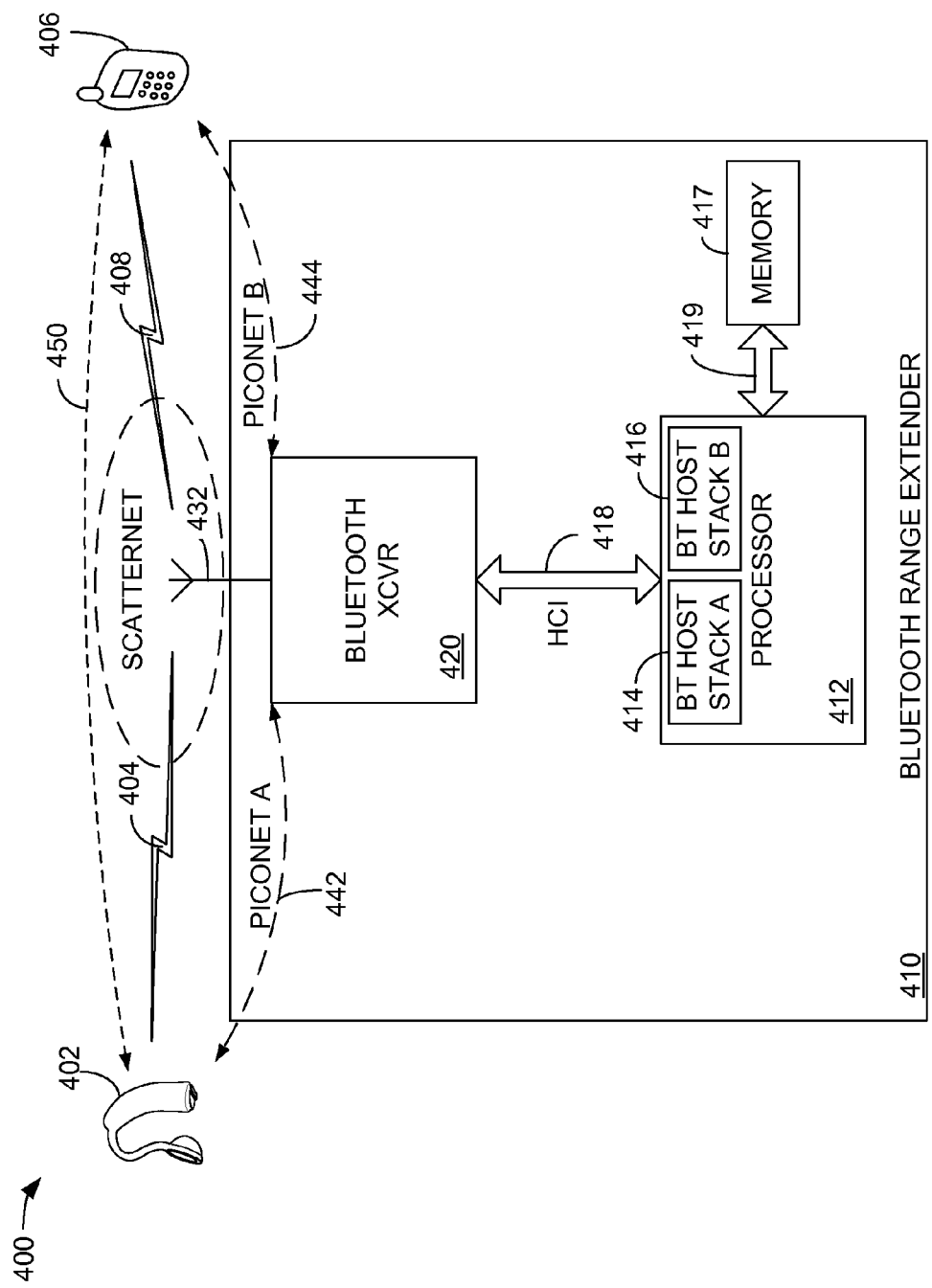
FIG. 4 is a functional block diagram illustrating a second embodiment of an apparatus for extending Bluetooth device range.

FIG. 4 is a functional block diagram 400 illustrating a second embodiment of an apparatus for extending Bluetooth device range. The description to follow will use HFP as an example Bluetooth profile. Other Bluetooth profiles, such as A2DP and others, are also possible. In the embodiment shown in FIG. 4, the Bluetooth range extender device 410 is an embodiment of the Bluetooth range extender device 110 and is implemented using a single Bluetooth transceiver 420. The transceiver 420 implements the AG role to a first standard Bluetooth device 402 and implements the HF role to a second standard Bluetooth device 406. In an embodiment, the first standard Bluetooth device 402 is an HF device, such as a wireless headset, and the second standard Bluetooth device 406 is an AG device, such as a handset.

The transceiver 420 implements a first Bluetooth communication link 404 between the communication system 432 and the first standard Bluetooth device 402. The transceiver 420 also implements a second Bluetooth communication link 408 between the communication system 432 and the second standard Bluetooth device 406.

The Bluetooth range extender device 410 also comprises a processor 412 in communication with the transceiver 420. As an example, the processor 412 communicates with the transceiver 420 over a host controller interface (HCI) 418. The processor 412 implements a first Bluetooth host protocol stack 414 and implements a second Bluetooth host protocol stack 416. The first Bluetooth host protocol stack 414 corresponds to first Bluetooth communication link 404 and the second Bluetooth host protocol stack 416 corresponds to second Bluetooth communication link 408 Implementing the first Bluetooth host protocol stack 414 and the second Bluetooth host protocol stack 416 allows the Bluetooth range extender device 410 to appear as an AG device to the first standard Bluetooth device 402 and as an HF device to the second standard Bluetooth device 406. The processor 412 is also in communication with a memory 417 over a communication bus 419. The memory 417 can comprise volatile memory, non-volatile memory, or a combination of volatile and non-volatile memory, and can store various instructions to be executed by the processor 412, such as the instructions to allow the Bluetooth range extender device 410 to function as described herein.

In this embodiment, the single Bluetooth transceiver 420 establishes a first piconet 442 with the first standard Bluetooth device 402 and establishes a second piconet 444 with the second standard Bluetooth device 406. When a single Bluetooth transceiver 420 implements two separate piconets, it is also referred to as a "scatternet." This allows a Bluetooth connection 450 to be established between the first standard Bluetooth device 402 and the second standard Bluetooth device 406 using the Bluetooth range extender device 410 to extend the communication range to an amount greater than if the first standard Bluetooth device 402 were directly connected to the second standard Bluetooth device 406.

When implementing the Bluetooth range extender device 410 using a single Bluetooth transceiver 420, the Bluetooth transceiver 420 either internally exchanges the SCO packets between the first piconet 442 and the second piconet 444, or sends the SCO data as data packets to the processor 412. This is referred to as SCO-over-HCl. In such an instance, the processor 412 exchanges the SCO data between the two connections (i.e., incoming SCO packets received from the transceiver 420 on one piconet would be sent back to the transceiver 420 as outgoing SCO packets for the other piconet).

The first Bluetooth communication link 404 and the second Bluetooth communication link 408 can be separately and independently optimized as described above with reference to FIG. 3.

Figure 5:
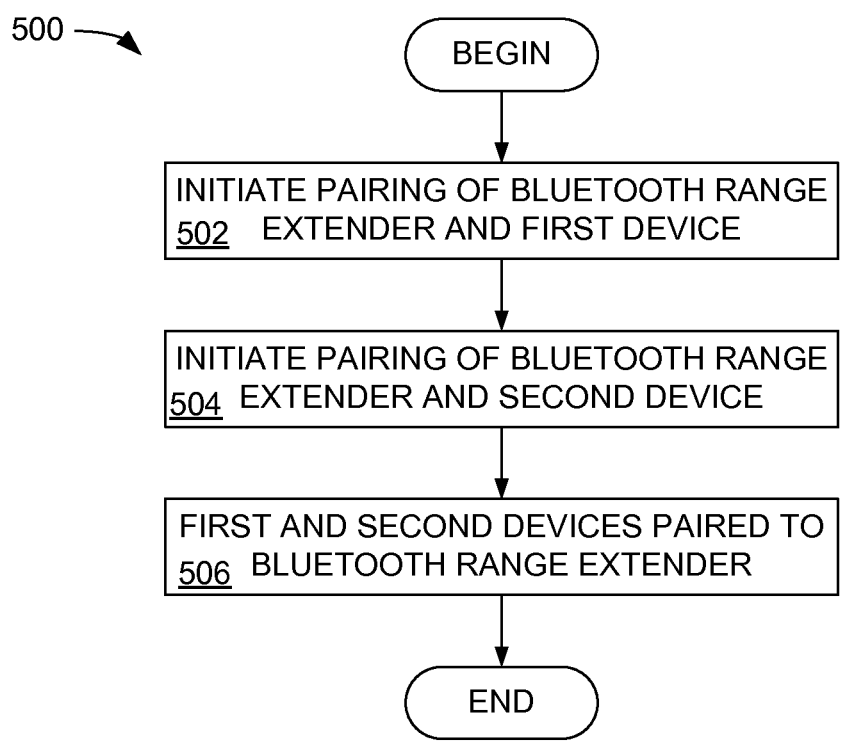
FIG. 5 is a flowchart describing an embodiment of a generic procedure for pairing first and second standard Bluetooth devices to the Bluetooth range extender device.

FIG. 5 is a flowchart 500 describing an embodiment of a generic procedure for pairing first and second standard Bluetooth devices to the Bluetooth range extender device. In block 502, the pairing of a first standard Bluetooth device and the Bluetooth range extender device is initiated. In block 504, the pairing of the Bluetooth range extender device and a second standard Bluetooth device is initiated. In block 506, the first and second standard Bluetooth devices are each paired to the Bluetooth range extender device.

Figure 6:
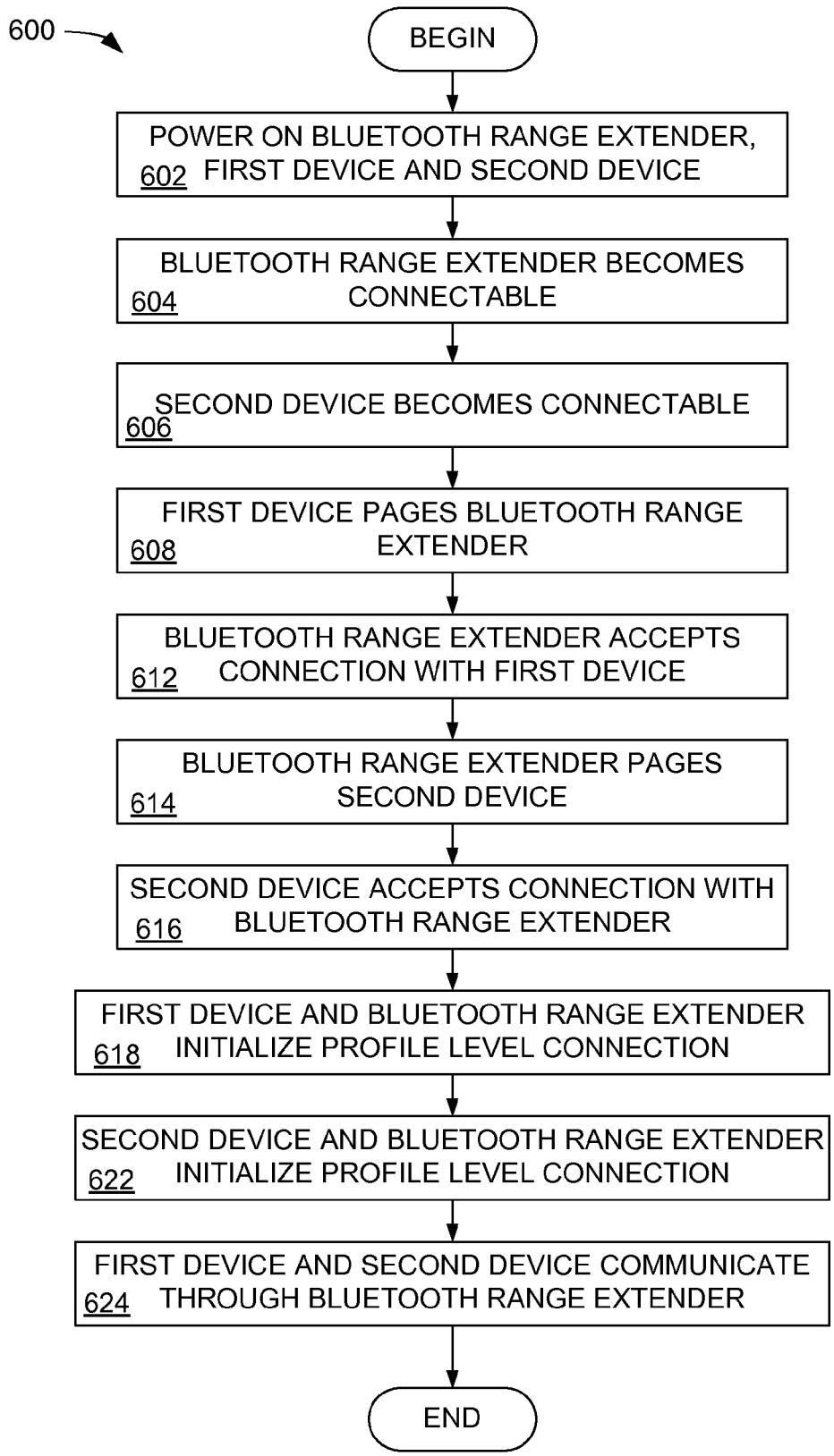
FIG. 6 is a flowchart describing the operation of an embodiment of a method for extending Bluetooth device range.

FIG. 6 is a flowchart describing the operation of an embodiment of a method for extending Bluetooth device range. The description in FIG. 6 will refer to the elements of FIG. 1 for simplicity of description. In block 602, the Bluetooth range extender device 110, the first standard Bluetooth device 102, and the second standard Bluetooth device 106 are powered on. In block 604, the Bluetooth range extender device 110 becomes connectable. In block 606, the second standard Bluetooth device 106 becomes connectable. In block 608, the first standard Bluetooth device 102 pages the Bluetooth range extender device 110. In block 612, the Bluetooth range extender device 110 accepts a connection with the first standard Bluetooth device 102. In block 614, the Bluetooth range extender device 110 pages the second standard Bluetooth device 106. In block 616, the second standard Bluetooth device 106 accepts a Bluetooth connection with the Bluetooth range extender device 110. In block 618, the first standard Bluetooth device 102 and the Bluetooth range extender device 110 initialize a profile level connection. In block 622, the second standard Bluetooth device 106 and the Bluetooth range extender device 110 initialize a profile level connection. In block 624, the first standard Bluetooth device 102 and the second standard Bluetooth device 106 communicate through the Bluetooth range extender device 110.

Figure 7A:
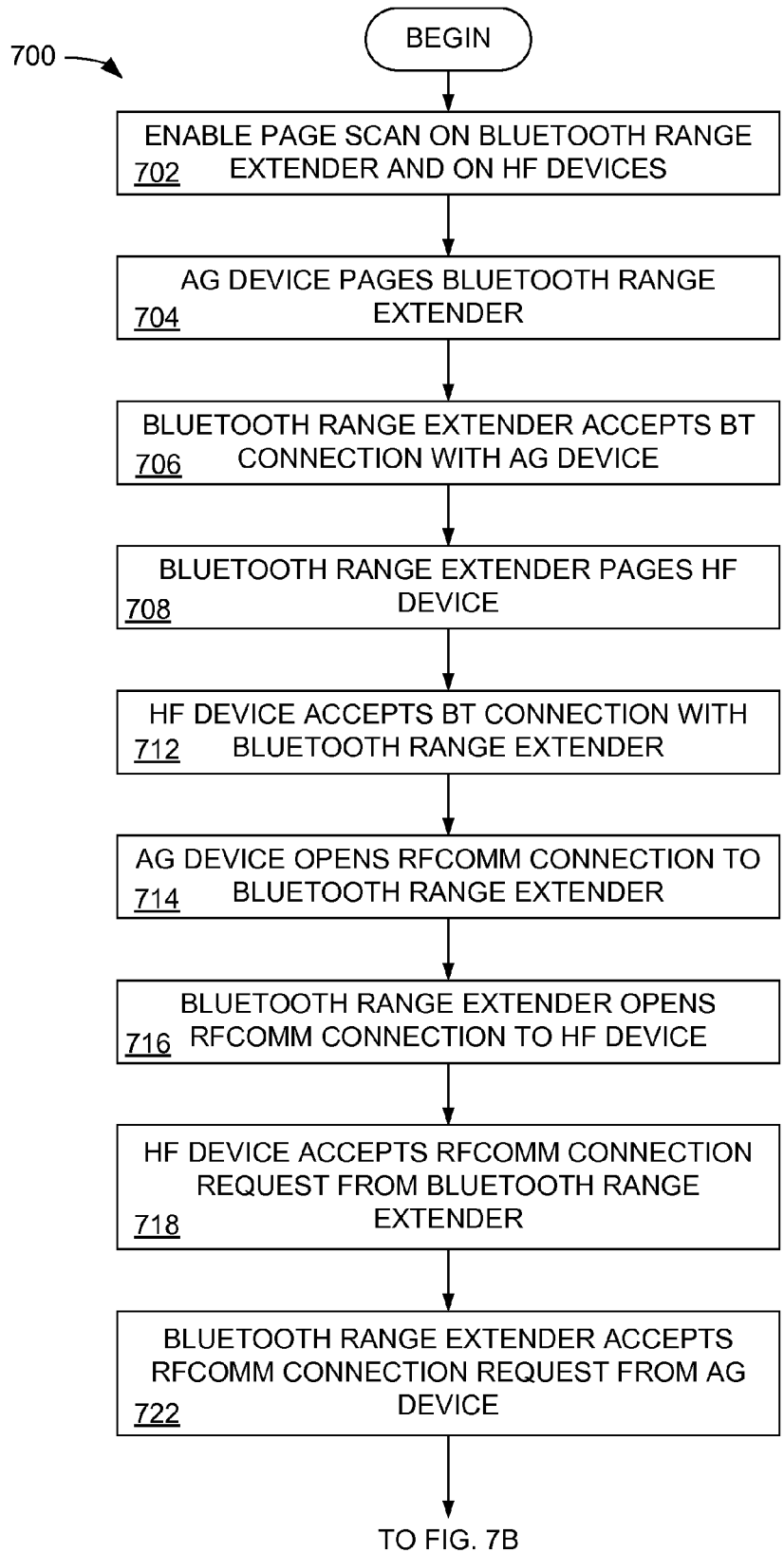
FIGS. 7A and 7B are a flow chart collectively describing the operation of another embodiment of a method for extending Bluetooth device range.
Figure 7B:
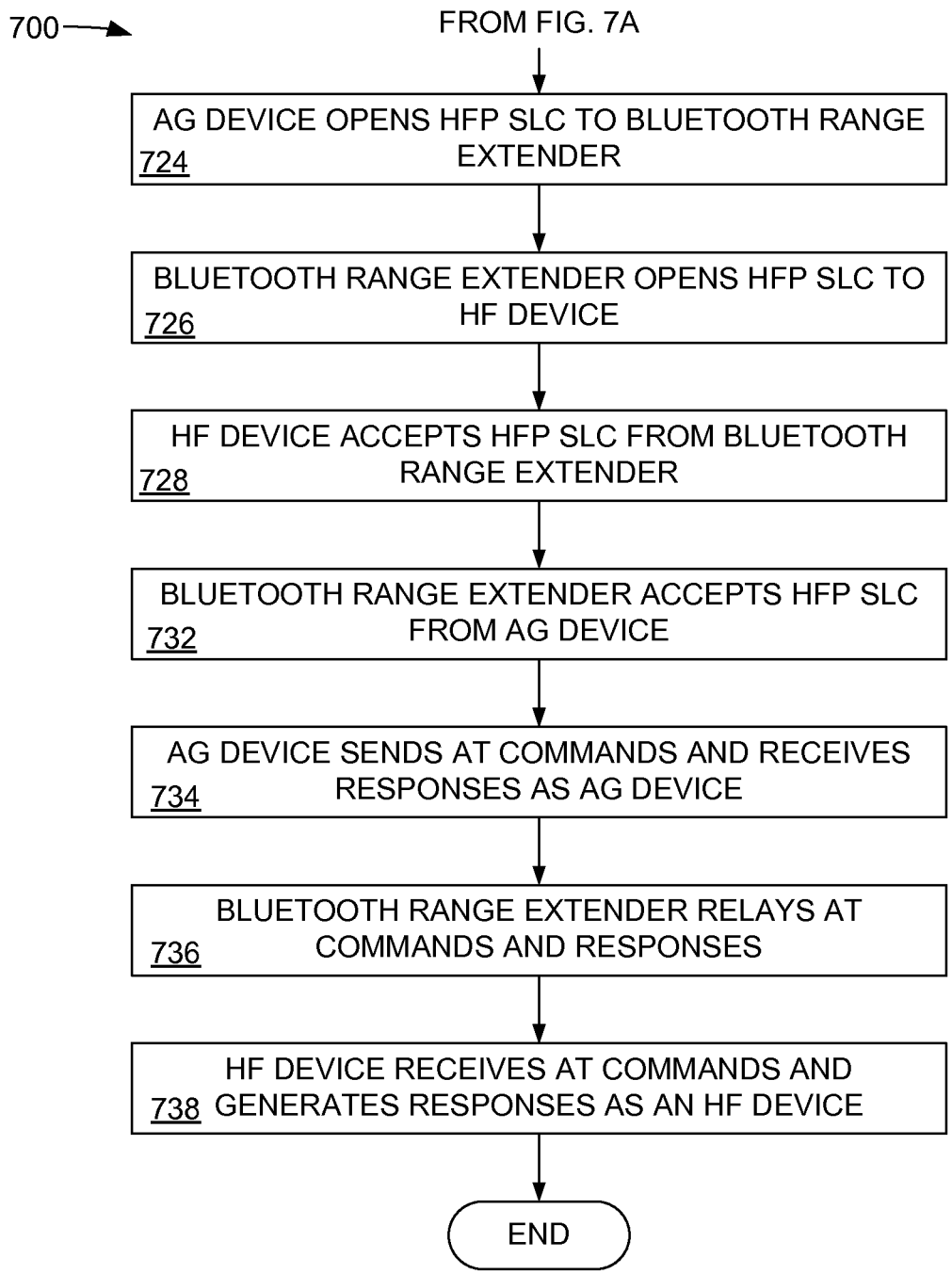

Implementing the Bluetooth range extender device 110 between two standard Bluetooth devices that would otherwise have a secure, encrypted connection between them presents some implementation challenges. Each standard Bluetooth device is separately paired to the Bluetooth range extender device 110 rather than being paired with each other. To satisfy all of the requirements of the Bluetooth security model, the Bluetooth range extender device 110 supports a screen as a way of displaying numbers used during the pairing process to allow the security process to occur. Examples of a security process include, but are not limited to, legacy PIN-code pairing and secure simple pairing (SSP), as known to those skilled in the art FIGS. 7A and 7B are a flow chart 700 collectively describing the operation of another embodiment of a method for extending Bluetooth device range. The flow chart of FIGS. 7A and 7B describe the connection of a first standard Bluetooth device and a second standard Bluetooth device through a Bluetooth range extender device when the devices are already paired and a handsfree profile (HFP) connection is desired. The description of the flow chart 700 will refer to the elements in FIG. 3 for simplicity. However, the flow chart 700 is also applicable to the embodiment shown in FIG. 4.

In block 702, page scan mode is enabled on the Bluetooth range extender device 310 and on the first standard Bluetooth device 302, which in this example, is an HF device.

In block 704, the second standard Bluetooth device 306, which in this example is an AG device, pages the Bluetooth range extender device 310. In block 706, the Bluetooth range extender device 310 accepts a Bluetooth connection with the second standard Bluetooth device 306 (the AG device). In block 708, the Bluetooth range extender device 310 pages the first standard Bluetooth device 302 (the HF device). In block 712, the first standard Bluetooth device 302 (the HF device) accepts a Bluetooth connection with the Bluetooth range extender device 310.

In block 714, the second standard Bluetooth device 306 (the AG device) opens an RFCOMM connection to the Bluetooth range extender device 310. In block 716, the Bluetooth range extender device 310 opens an RFCOMM connection to the first standard Bluetooth device 302 (the HF device). In block 718, the first standard Bluetooth device 302 (the HF device) accepts the RFCOMM connection request from the Bluetooth range extender device 310. In block 722, the Bluetooth range extender device 310 accepts the RFCOMM connection request from the second standard Bluetooth device 306 (the AG device).

In block 724, the second standard Bluetooth device 306 (the AG device) opens a handsfree profile (HFP) service level connection (SLC) to the Bluetooth range extender device 310. In block 726, the Bluetooth range extender device 310 opens an HFP SLC to the first standard Bluetooth device 302 (the HF device). In block 728, the first standard Bluetooth device 302 (the HF device) accepts the HFP SLC from the Bluetooth range extender device 310. In block 732, the Bluetooth range extender device 310 accepts the HFP SLC from the second standard Bluetooth device 306 (the AG device).

In block 734, the second standard Bluetooth device 306 (the AG device) sends AT commands and receives responses as an AG device. In block 736, the Bluetooth range extender device 310 relays the AT commands and responses to the first standard Bluetooth device 302 (the HF device). In block 738, the first standard Bluetooth device 302 (the HF device) receives the AT commands and generates responses as an HF device.

Figure 8:
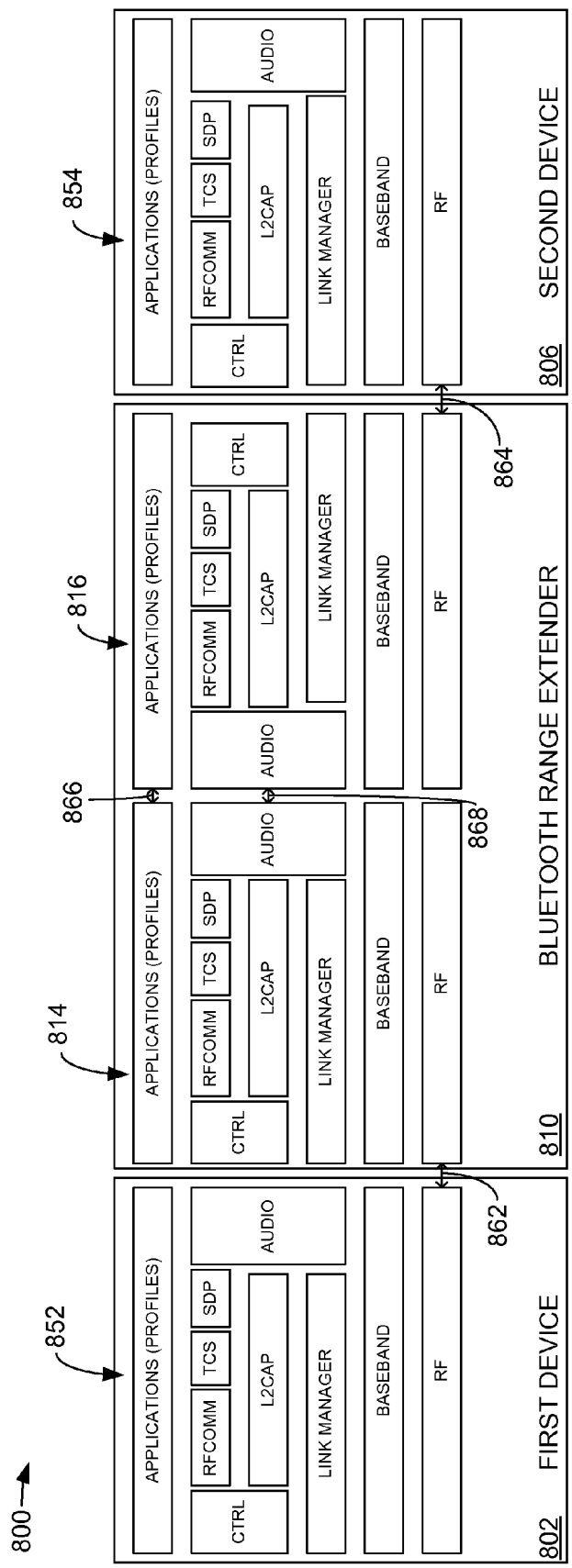
FIG. 8 is a block diagram illustrating the profile-level connectivity of a Bluetooth range extender device and two standard Bluetooth devices using Bluetooth protocol stacks located in the respective devices.

FIG. 8 is a block diagram 800 illustrating the profile-level connectivity of a Bluetooth range extender device and two standard Bluetooth devices using Bluetooth protocol stacks located in the respective devices.

A first standard Bluetooth device 802 includes a Bluetooth protocol stack 852. A second standard Bluetooth device 806 comprises a Bluetooth protocol stack 854. A Bluetooth range extender device 810 comprises a first Bluetooth host protocol stack 814 and a second Bluetooth host protocol stack 816.

The arrow 862 indicates that there is an RF connection between the Bluetooth range extender device 810 and the first standard Bluetooth device 802. The arrow 864 indicates that there is an RF connection between the Bluetooth range extender device 810 and the second standard Bluetooth device 806.

The arrow 866 indicates that there is a profile level connection between the first Bluetooth host protocol stack 814 and the second Bluetooth host protocol stack 816.

The arrow 868 indicates that there is an audio connection between the first Bluetooth host protocol stack 814 and the second Bluetooth host protocol stack 816.

In this manner, the Bluetooth range extender device 810 appears as an AG device to the first standard Bluetooth device 802 (the HF device) and appears as an HF device to the second standard Bluetooth device 806 (the AG device), thus enabling communication between the endpoint devices and thereby extending the communication range available between the first standard Bluetooth device 802 and the second standard Bluetooth device 806.

Figure 9A:
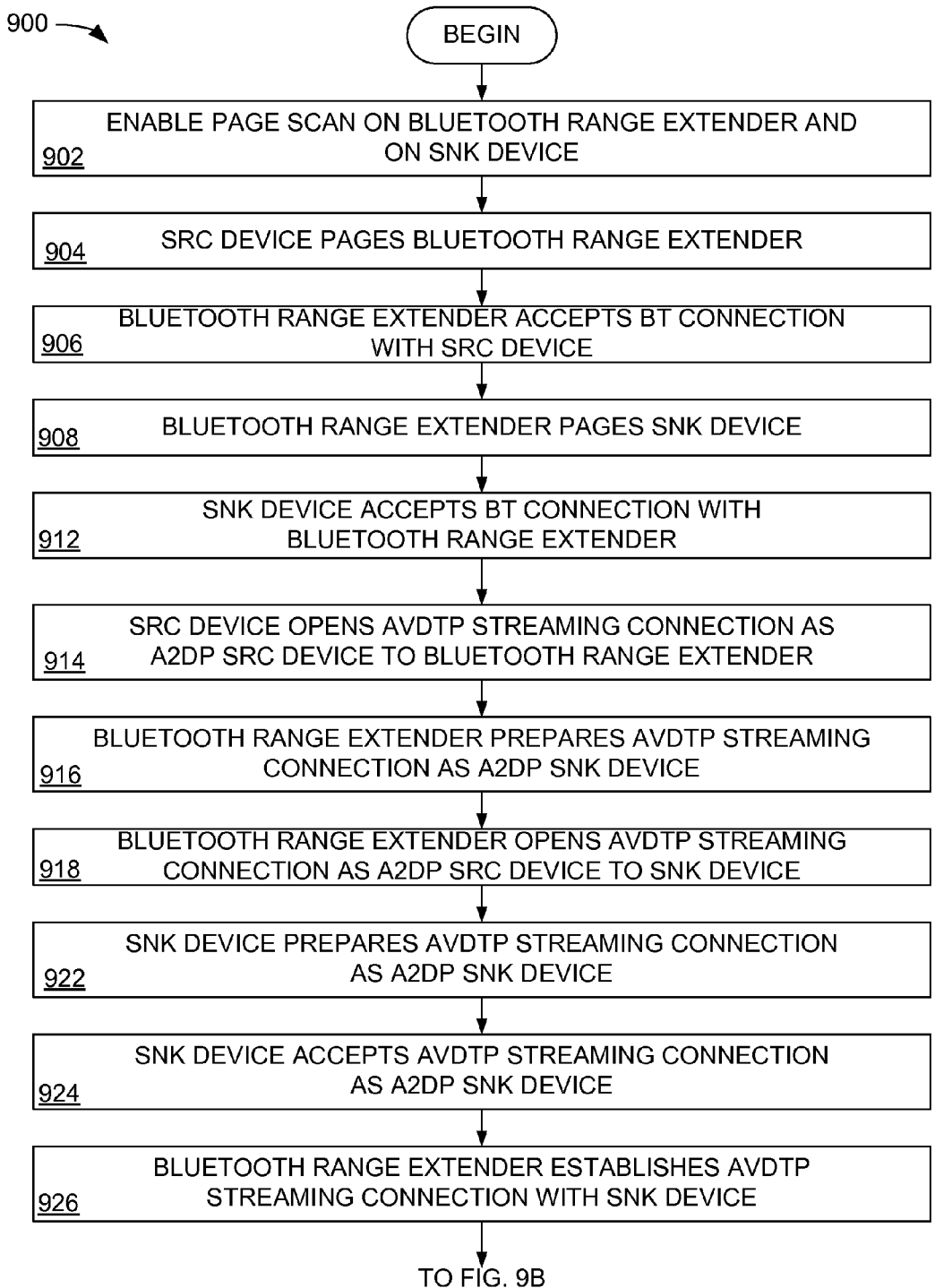
FIGS. 9A and 9B are a flow chart collectively describing the operation of another embodiment of a method for extending Bluetooth device range.
Figure 9B:
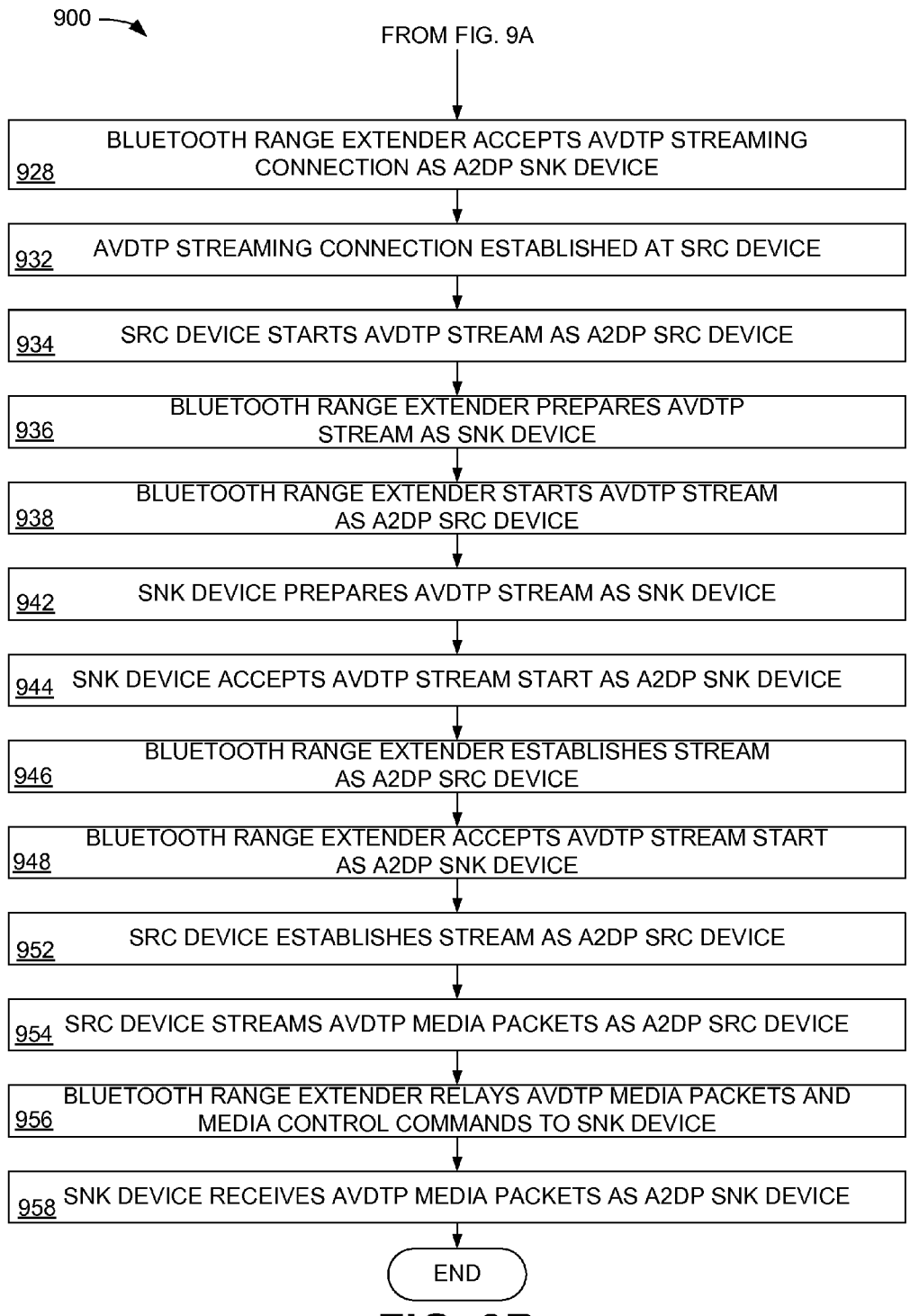

FIGS. 9A and 9B are a flow chart 900 collectively describing the operation of another embodiment of a method for extending Bluetooth device range. The flow chart of FIGS. 9A and 9B describe the connection of a first standard Bluetooth device and a second standard Bluetooth device through a Bluetooth range extender device when the devices are already paired and an advanced audio distribution profile (A2DP) connection is desired. The description of the flow chart 900 will refer to the elements in FIG. 3 for simplicity. However, the flow chart 900 is also applicable to the embodiment shown in FIG. 4.

In block 902, page scan mode is enabled on the Bluetooth range extender device 310 and on the first standard Bluetooth device 302, which in this example, is an SNK device.

In block 904, the second standard Bluetooth device 306, which in this example is an SRC device, pages the Bluetooth range extender device 310. In block 906, the Bluetooth range extender device 310 accepts a Bluetooth connection with the second standard Bluetooth device 306 (the SRC device). In block 908, the Bluetooth range extender device 310 pages the first standard Bluetooth device 302 (the SNK device). In block 912, the first standard Bluetooth device 302 (the SNK device) accepts a Bluetooth connection with the Bluetooth range extender device 310.

In block 914, the second standard Bluetooth device 306 (the SRC device) opens an AVDTP streaming connection as an A2DP SRC device to the Bluetooth range extender device 310. In block 916, the Bluetooth range extender device 310 prepares an AVDTP streaming connection as an A2DP SNK device. In block 918, the Bluetooth range extender device 310 opens an AVDTP streaming connection as an A2DP SRC device to the first standard Bluetooth device 302 (the SNK device).

In block 922, the first standard Bluetooth device 302 (the SNK device) prepares an AVDTP streaming connection as an A2DP SNK device. In block 924, the first standard Bluetooth device 302 (the SNK device) accepts the AVDTP streaming connection request from the Bluetooth range extender device 310 as an A2DP SNK device. In block 926, the Bluetooth range extender device 310 establishes an AVDTP streaming connection with the first standard Bluetooth device 302 (the SNK device). In block 928, the Bluetooth range extender device 310 accepts the AVDTP streaming connection from the second standard Bluetooth device 306 (the SRC device) as an A2DP SNK device.

In block 932, an AVDTP streaming connection is established at the second standard Bluetooth device 306 (the SRC device). In block 934, the second standard Bluetooth device 306 (the SRC device) starts an AVDTP stream as an A2DP SRC device. In block 936, the Bluetooth range extender device 310 prepares an AVDTP stream as an A2DP SNK device. In block 938, the Bluetooth range extender device 310 starts an AVDTP stream as an A2DP SRC device.

In block 942, the first standard Bluetooth device 302 (the SNK device) prepares an AVDTP stream as an A2DP SNK device. In block 944, the first standard Bluetooth device 302 (the SNK device) accepts an AVDTP stream start as an A2DP SNK device. In block 946, the Bluetooth range extender device 310 establishes an AVDTP stream as an A2DP SRC device.

In block 948, the Bluetooth range extender device 310 accepts an AVDTP stream start as an A2DP SNK device. In block 952, the second standard Bluetooth device 306 (the SRC device) establishes an AVDTP stream as an A2DP SRC device.

In block 954, the second standard Bluetooth device 306 (the SRC device) streams AVDTP media packets as an A2DP SRC device. In block 956, the Bluetooth range extender device 310 relays AVDTP media packets and media control commands to the first standard Bluetooth device 302 (the SNK device). In block 958, the first standard Bluetooth device 302 (the SNK device) receives AVDTP media packets as an A2DP SNK device.

As discussed above, a first standard Bluetooth device (e.g., standard Bluetooth devices 102, 302, 402, 802) and a second standard Bluetooth device (e.g., standard Bluetooth devices 106, 306, 406, 806) may be used in connection with an intermediate Bluetooth range extender (e.g., Bluetooth range extenders 110, 310, 410, 810). In some embodiments, the first and second standard Bluetooth devices may be used in connection with a series of two or more intermediate Bluetooth range extenders.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-ray Disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An apparatus for extending Bluetooth device range, comprising:
   a Bluetooth range extender device implementing at least two Bluetooth communication profiles such that the Bluetooth range extender device implements a first role to a first standard Bluetooth communication device and implements a second role to a second standard Bluetooth communication device;
   wherein the first role is implemented over a first Bluetooth communication link at a profile level and the second role is implemented over a second Bluetooth communication link at the profile level;
   wherein the first Bluetooth communication link is a first piconet and the second Bluetooth communication link is a second piconet;
   wherein the first role and the second role are implemented using separate Bluetooth transceivers, which allows the first Bluetooth communication link and the second Bluetooth communication link to be independently modified comprising techniques chosen from customizing automatic frequency hopping (AFH) for each of the first Bluetooth communication link and the second Bluetooth communication link, managing transmit power control independently for the first Bluetooth communication link and the second Bluetooth communication link, and locating the first standard Bluetooth communication device and the second Bluetooth communication device in proximity to the Bluetooth range extender device so as to consume less power in any of the first standard Bluetooth communication device and the second Bluetooth communication device than if the first standard Bluetooth communication device and the second Bluetooth communication device were directly connected.

2. The apparatus of claim 1, wherein the first role and the second role are implemented using a single Bluetooth transceiver operating as a scatternet.

3. The apparatus of claim 1, wherein the first role is a HandsFree Profile Handsfree Device (HF) role and the second role is a HandsFree Profile Audio Gateway (AG) role.

4. The apparatus of claim 1, wherein the first role is an A2DP Sink (SNK) role and the second role is an A2DP Source (SRC) role.

5. The apparatus of claim 1, wherein the first standard Bluetooth communication device and the second standard Bluetooth communication device pair with the Bluetooth range extender device using a security process.

6. The apparatus of claim 5, wherein the security process is chosen from legacy PIN-code pairing and secure simple pairing (SSP).

7. A method for extending Bluetooth device range, comprising:
   establishing at least two independent Bluetooth connections to a range extender device, including one connection to a first Bluetooth device and another connection to a second Bluetooth device;
   establishing a first L2CAP layer connection between the range extender device and the first Bluetooth device and a separate second L2CAP layer connection between the range extender device and the second Bluetooth device;
   establishing a first profile level connection between the range extender device and the first Bluetooth device and a separate second profile level connection between the range extender device and the second Bluetooth device; and
   exchanging profile-level data between the separate first and second profile level connections within the range extender device, to allow communication between the first and second Bluetooth devices through the range extender device;
   implementing the first Bluetooth communication link as a first piconet;
   implementing the second Bluetooth communication link as a second piconet; and
   implementing the first role and the second role using separate Bluetooth transceivers;
   wherein implementing the first role and the second role using separate Bluetooth transceivers further comprises independently modifying the first Bluetooth communication link and the second Bluetooth communication link;
   wherein independently modifying the first Bluetooth communication link and the second Bluetooth communication link comprises techniques chosen from customizing automatic frequency hopping (AFH) for each of the first Bluetooth communication link and the second Bluetooth communication link, managing transmit power control independently for the first Bluetooth communication link and the second Bluetooth communication link, and locating the first standard Bluetooth communication device and the second Bluetooth communication device in proximity to the Bluetooth range extender device so as to consume less power in any of the first standard Bluetooth communication device and the second Bluetooth communication device than if the first standard Bluetooth communication device and the second Bluetooth communication device were directly connected.

8. The method of claim 7, further comprising implementing the first role and the second role using a single Bluetooth transceiver operating as a scatternet.

9. The method of claim 7, wherein the first role is a HandsFree Profile Handsfree Device (HF) role and the second role is a HandsFree Profile Audio Gateway (AG) role.

10. The method of claim 7, wherein the first role is an A2DP Sink (SNK) role and the second role is an A2DP Source (SRC) role.

11. The method of claim 7, further comprising implementing a security process when establishing a Bluetooth connection between the two standard Bluetooth communication devices and the range extender device.

12. The method of claim 11, wherein the security process is chosen from legacy PIN-code pairing and secure simple pairing (SSP).

* * * * *